June 6, 1950 — C. G. VOKES — 2,510,440
FILTER AND SILENCER UNIT
Filed Oct. 25, 1946 — 2 Sheets-Sheet 1

INVENTOR
CECIL G. VOKES
BY
ATTY.

June 6, 1950     C. G. VOKES     2,510,440
FILTER AND SILENCER UNIT

Filed Oct. 25, 1946     2 Sheets—Sheet 2

INVENTOR
CECIL G. VOKES
BY
ATTY.

UNITED STATES PATENT OFFICE 2,510,440

FILTER AND SILENCER UNIT

Cecil Gordon Vokes, Guildford, England, assignor to Vokes Limited, Guildford, England Application October 25, 1946, Serial No. 705,554
In Great Britain March 13, 1946

4 Claims. (Cl. 183—71)

This invention is designed to provide a simple and compact form of combined filter and silencer for the air intakes of internal combustion engines, compressors and the like, of the kind in which the air is filtered and a high frequency eliminator as well as a low frequency silencing chamber and the silencing effect of filtering material are employed.

It is a characteristic of these devices that the noises to be silenced are derived from the engine or the like (hereinafter called the engine) towards which the air is drawn: and in those constituting the present invention the incoming air passes into a zone of high frequency elimination, through a low frequency silencing chamber and through fibrous or other silencing and filtering material in that order. An annular chamber on the engine side of the filtering material may form a further silencing chamber from which the air is conducted by a transverse branch to the engine intake. The filter unit embodying the filtering material can thus be carried by or lie within a removable cap where the air flow is reversed and is very readily accessible for cleaning or replacement.

According to a further part of the invention the entering air comes into the zone of high frequency elimination laterally, preferably radially towards the centre through slots in the outer case or the equivalent, so that the opening into the high frequency eliminator is opposite to the entry into the axial low frequency silencing chamber through which the air next passes.

According to another such part the filter unit is tapered to form the outer sound absorbing or damping wall of a chamber converging in the direction of flow of the air emerging from the low frequency silencer. Such a unit, when suitably placed within a cylindrical or annular space, tends to equalise the flow of the air both prior to and after filtration: it can be readily produced from a star-shaped cylindrical element of filtering fabric and wire gauze by forming it to a smaller diameter towards one end or a larger diameter towards the other or both. In other words, the material of the element is first formed with similar parallel pleats and it is subsequently modified to tapered form. A filter element so formed itself constitutes an important part of the invention.

Figure 1:
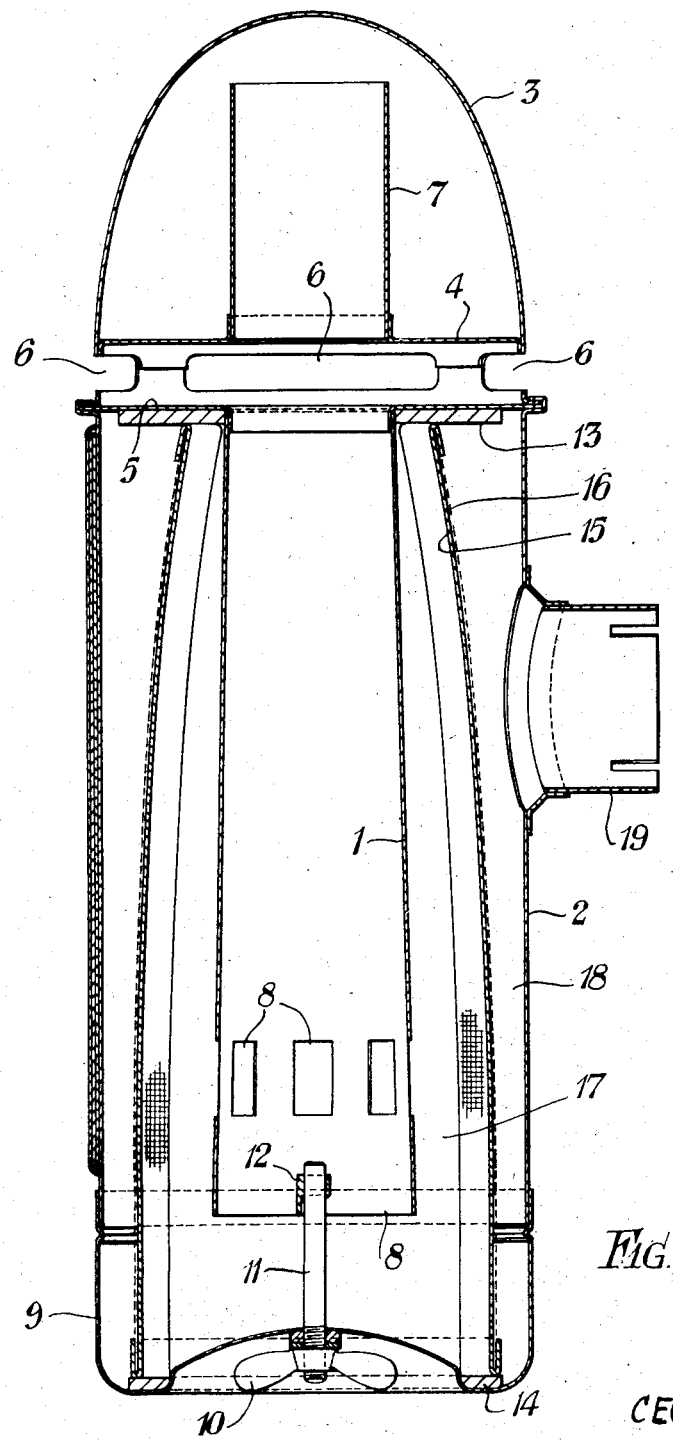
Figure 2:
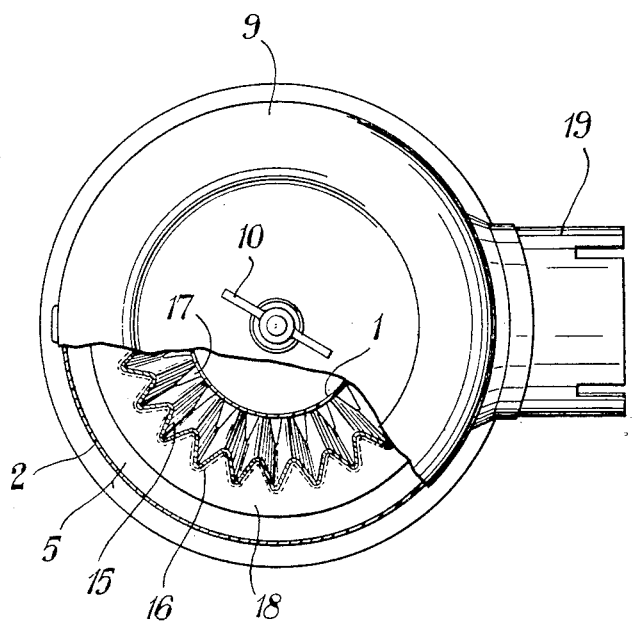

A typical form is illustrated by the accompanying drawings in which:

Fig. 1 is a central longitudinal section, and
Fig. 2 is an end view, partly in section.

In this form, the combined filter and silencer has a main body part comprising a central tube 1 and a concentric outer case 2. A domed cap 3, fitted to the outer case 2, has two partitions 4, 5 defining a space into which the air is admitted through circumferential slot 6. Extending into the dome from the partition 4 is a central tube 7 (or possibly several tubes) of suitable design to constitute with the domed end the desired reduced pressure or high frequency elimination chamber. The central tube 1 of the main body part leads from a central aperture in the other partition 5 and is carried to the requisite length and formation for the required frequency elimination, with appropriate apertures 8 near or at the end (or both).

A closure cap 9 is fitted to the outer case, so that the air turns back into the annulus between the central tube and outer case. The closure cap 9 may be secured by a wing-nut 10 engaging a threaded rod 11 which may be carried by a cross bar or spider 12 at the end of the tube 8. Felt or like discs 13, 14 are fitted inside the partition at the far end of the annulus and in the closing cap respectively and make joint with the ends of the tapered star-shaped or deeply pleated filter unit, formed from a cylindrical element of the deeply pleated material by compressing one end, so that it tapers to a smaller diameter at the end remote from the cap. Suitable material for forming the element in this way is felt or textile material 15 stitched to metal gauze 16 or other suitable stiffening material, the combined material then being formed into parallel pleats and bent and secured in cylindrical form, before compressing one end to reduce the diameter and lessen the spacing of the pleats towards that end so as to form the tapered element shown. By removing the cap 9, the filter element 15, 16 can thus be readily removed for cleaning or replacement. The air which has passed into the tapered annular space 17 inside the filter element will then emerge through the filtering material into a reversely tapered annular space 18 outside the filter element. The space 18 communicates with a lateral branch 19 which forms the outlet for the filtered air from the combined filter and silencer to the engine intake.

Either tube or casing may advantageously be tapered in some cases.

Other suitable forms of filter unit may be used within the wider aspects of the invention, for instance a brush type.

I claim:

1. A filter and silencer assembly, comprising a narrow inlet chamber having inlet openings, a reduced pressure high frequency elimination chamber opening into one side of said inlet chamber, a tubular low frequency silencing chamber opening at one end into the opposite side of said inlet chamber and closely adjacent said frequency elimination chamber opening, an outlet opening in the other end of said silencing chamber, a filter chamber surrounding said outlet opening end of said silencer chamber, a cylindrical filter element dividing said filter chamber into concentric sections with the inner of said sections being in communication with said silencer chamber outlet, and an outlet for filtered air opening laterally from the outer of said sections.

2. In a filter and silencer assembly as defined in claim 1, wherein said cylindrical filter is removably mounted and the end of said filter chamber is closed by a removable cap which supports one end of said filter.

3. A filter and silencer assembly as defined in claim 1, wherein said cylindrical filter extends the length of said filter chamber and surrounds said silencing chamber, said filter being pleated and tapered from its end of largest diameter surrounding the silencing chamber outlet, and said filter chamber outlet is located behind the silencing chamber outlet to cause the path of flow to reverse and extend longitudinally of the filter and toward the smaller end thereof.

4. In a filter and silencer assembly the combination of an inner tubular passage member for receiving incoming air, a chamber having an opening opposite and spaced from but closely adjacent to the air receiving end of the tubular passage member whereby a reduced pressure is caused in said chamber when the air is flowing into the said tubular passage member, an open-ended outer casing surrounding said tubular passage member and spaced from said chamber to define an air inlet for said tubular passage, a removable closure member closing the end of the said outer casing, a tubular filter element within said outer casing and surrounding said tubular passage member, said tubular filter element being removable from and replaceable in the said outer casing when said closure member is removed, and a lateral connection from said outer casing forming an outlet for air which has traversed said tubular passage member and passed through said filter element.

CECIL GORDON VOKES.

REFERENCES CITED

The following references are of record in the file of this patent:

UNITED STATES PATENTS

| Number | Name | Date |
|---|---|---|
| 926,070 | Matchette | June 22, 1909 |
| 1,702,804 | Winslow | Feb. 19, 1929 |
| 2,020,581 | Orem | Aug. 11, 1936 |
| 2,085,702 | Kitto | June 29, 1937 |
| 2,170,902 | Kamrath | Aug. 29, 1939 |

FOREIGN PATENTS

| Number | Country | Date |
|---|---|---|
| 367,009 | Great Britain | Feb. 10, 1932 |
| 391,180 | Great Britain | Apr. 18, 1933 |